US012406588B1

(12) United States Patent
Telles

(10) Patent No.: US 12,406,588 B1
(45) Date of Patent: Sep. 2, 2025

(54) TECHNIQUE FOR MITIGATING NUISANCE TO A NEIGHBORHOOD FROM A UAV DELIVERY SERVICE

(71) Applicant: WING Aviation LLC, Mountain View, CA (US)

(72) Inventor: Bernardo Telles, Fremont, CA (US)

(73) Assignee: Wing Aviation LLC, Palo Alto, CA (US)

( * ) Notice: Subject to any disclaimer, the term of this patent is extended or adjusted under 35 U.S.C. 154(b) by 177 days.

(21) Appl. No.: 18/242,930

(22) Filed: Sep. 6, 2023

(51) Int. Cl.
| | | |
|---|---|---|
| *B64U 10/20* | (2023.01) | |
| *G06N 3/044* | (2023.01) | |
| *G06N 3/084* | (2023.01) | |
| *G08G 5/32* | (2025.01) | |
| *G08G 5/55* | (2025.01) | |
| *G08G 5/57* | (2025.01) | |
| *B64U 101/64* | (2023.01) | |

(52) U.S. Cl.
CPC ............. *G08G 5/55* (2025.01); *G06N 3/044* (2023.01); *G06N 3/084* (2013.01); *G08G 5/32* (2025.01); *G08G 5/57* (2025.01); *B64U 10/20* (2023.01); *B64U 2101/64* (2023.01)

(58) Field of Classification Search
CPC .. G08G 5/55; G08G 5/57; G08G 5/32; G06N 3/044; G06N 3/084; B64U 2101/64; B64U 10/20
See application file for complete search history.

(56) References Cited

U.S. PATENT DOCUMENTS

| | | |
|---|---|---|
| 6,198,991 B1 | 3/2001 | Yamakawa et al. |
| 8,908,573 B1 | 12/2014 | Wang et al. |

(Continued)

FOREIGN PATENT DOCUMENTS

| | | | | |
|---|---|---|---|---|
| EP | 3764062 A1 * | 1/2021 | ............... | G08G 5/76 |
| WO | 2017143588 A1 | 8/2017 | | |

OTHER PUBLICATIONS

Bian et al. "Assessment of UAM noise impact on the environment based on virtual flights with realistic sources," The Hong Kong University of Science and Technology, Department of Mechanical and Aerospace Engineering, Delft International Conference on Urban Air-Mobility, DICUAM 2021, Mar. 15-17, 2021, 11 pages.
Bulusu et al. "Extended Abstract: Noise Estimation for future large-scale small UAS Operations," Cal Unmanned Lab, CEE Department, University of California Berkeley, USA, and Communication and Transport Systems ITN, Linkoping University, Sweden, received prior to Sep. 6, 2023, 8 pages.

(Continued)

*Primary Examiner* — Peter D Nolan
*Assistant Examiner* — Matthew Cobb
(74) *Attorney, Agent, or Firm* — Christensen O'Connor Johnson Kindness PLLC

(57) ABSTRACT

A technique for mitigating nuisance to a neighborhood from operations of an UAV delivery service includes: calculating nuisance contributions to the neighborhood for each of a plurality of UAV flights over the neighborhood; aggregating the nuisance contributions for each of the UAV flights into a nuisance heat map stored in a nuisance exposure database; receiving, at a machine learning (ML) model, a flight routing request to fly a new delivery mission over the neighborhood; and generating a new flight path for the new delivery mission with the ML model in response to receiving the flight routing request. The ML model is trained to receive the nuisance heat map and the flight routing request as inputs and output the new flight path that optimizes a total nuisance contribution that the new delivery mission will contribute to the neighborhood.

20 Claims, 8 Drawing Sheets

(56) References Cited

U.S. PATENT DOCUMENTS

| | | |
|---|---|---|
| 9,415,870 B1 | 8/2016 | Beckman et al. |
| 9,422,055 B1 | 8/2016 | Beckman et al. |
| 9,489,937 B1 * | 11/2016 | Beard ................ G10L 21/0216 |
| 9,646,597 B1 | 5/2017 | Beckman et al. |
| 9,805,273 B1 | 10/2017 | Seeber et al. |
| 10,370,093 B1 | 8/2019 | Beckman et al. |
| 10,371,567 B2 | 8/2019 | Lee |
| 10,515,557 B2 | 12/2019 | Kubie et al. |
| 11,157,867 B1 * | 10/2021 | Jordan .................... G05D 1/104 |
| 2005/0271221 A1 | 12/2005 | Cerwin |
| 2010/0017114 A1 * | 1/2010 | Tehan ....................... G08G 5/32 701/423 |
| 2012/0296499 A1 | 11/2012 | Kirchhofer et al. |
| 2013/0317667 A1 | 11/2013 | Kruglick |
| 2015/0362920 A1 | 12/2015 | McGregor et al. |
| 2016/0027307 A1 | 1/2016 | Abhyanker et al. |
| 2016/0063987 A1 | 3/2016 | Xu et al. |
| 2016/0116914 A1 | 4/2016 | Mucci |
| 2017/0076610 A1 | 3/2017 | Liu et al. |
| 2017/0169713 A1 | 6/2017 | Gong et al. |
| 2018/0189516 A1 | 7/2018 | Browning et al. |
| 2018/0240346 A1 | 8/2018 | Maeki et al. |
| 2019/0004172 A1 | 1/2019 | Moskovchenko et al. |
| 2019/0189016 A1 * | 6/2019 | Kubie .................... G08G 5/727 |
| 2019/0340934 A1 * | 11/2019 | Villa ........................ G08G 5/56 |
| 2021/0221506 A1 * | 7/2021 | Phelan .................. G01S 13/951 |

OTHER PUBLICATIONS

Ramos-Romero et al. "Requirements for Drone Operations to Minimise Community Noise Impact," International Journal of Environmental Research and Public Health 2022, 19, 9299. https://doi.org/10.3390/ijerph19159299, 16 pages.

* cited by examiner

TECHNIQUE FOR MITIGATING NUISANCE TO A NEIGHBORHOOD FROM A UAV DELIVERY SERVICE

TECHNICAL FIELD

This disclosure relates generally to unmanned aerial vehicles (UAVs), and in particular but not exclusively, relates to noise mitigation for a UAV delivery service.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby enabling package pick-ups and deliveries almost anywhere. As UAVs become increasingly popular, their use over populated or sensitive areas, such as suburban and urban localities, means that controlling and mitigating noise exposure to these vehicles is increasingly important.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
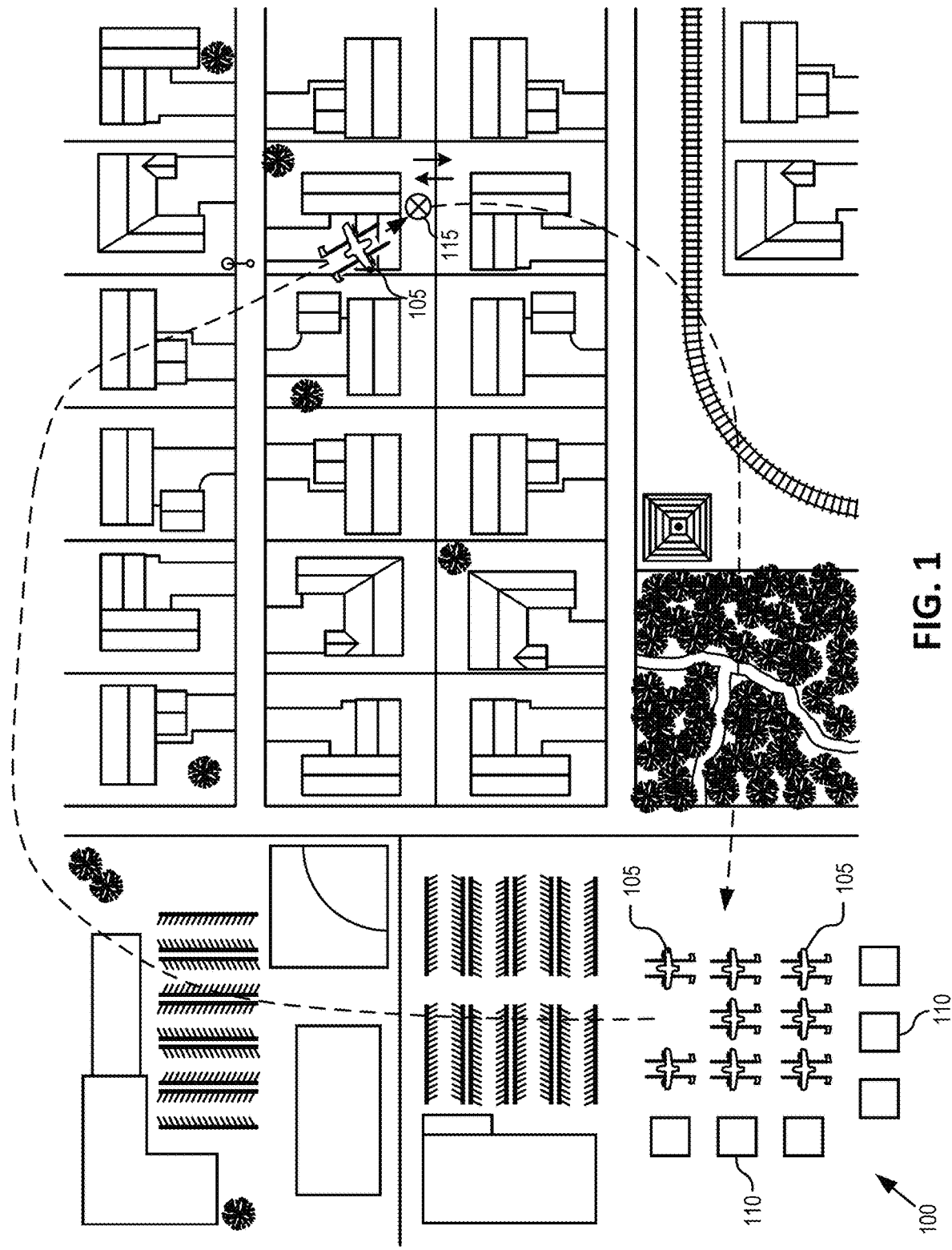
FIG. 1 illustrates operation of an unmanned aerial vehicle (UAV) delivery system that delivers packages into a neighborhood, in accordance with an embodiment of the disclosure.

Embodiments of a system, apparatus, and method for mitigating nuisance to a neighborhood due to operations of an unmanned aerial vehicle (UAV) delivery service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations of a UAV delivery service that delivers packages into or over a neighborhood may be perceived by some individuals as a nuisance to the people or animals occupying that neighborhood. This perceived nuisance may be a noise nuisance, a visual nuisance, a physical presence nuisance, or otherwise. The typical nuisance perceived by humans may likely be noise while others may be concerned with disruptions to wildlife over parks, forests, or other wildlife enclaves. Reducing the impact of these perceived nuisances on a community/neighborhood is important to the viability of a UAV delivery service. If these perceived nuisances can be ameliorated or mitigated, then the numerous benefits (e.g., low-cost deliveries, low latency deliveries, low carbon deliveries, energy efficient deliveries, alleviate road noise/congestion, etc.) of a UAV delivery service can be more fully enjoyed and appreciated by the residents of a community/neighborhood.

Embodiments described herein mitigate nuisance due to operations of a UAV delivery service by determining optimized routes that reduce or minimize nuisance impact on a neighborhood. The optimized routes not only identify routes with the lowest nuisance impact but also load balance that impact over the neighborhood to reduce the likelihood that any one individual suffers an undue disproportionate impact. New route selection may account for land use (e.g., zoning) such that routes are selected to preferentially avoid properties zoned residential while preferring routes over noisy roads, industrial zones, commercial zones, or unused/underused land. Embodiments described combine historical flight data with land use data to compute nuisance contributions, which are aggregated into a nuisance heat map stored in a nuisance exposure database. Flight routing requests to fly a new delivery mission over a given neighborhood along with the nuisance heat map are provided to a machine learning (ML) model that has been trained to generate new flight paths. A new flight path is generated by the ML model to optimize a total nuisance contribution that the new delivery mission will contribute to the neighborhood. In various embodiments, the ML model is implemented using a recurrent neural network.

FIG. 1 is a plan view illustration including a terminal area 100 for staging UAVs 105 that deliver packages into a neighborhood, in accordance with an embodiment of the disclosure. UAVs may one day routinely deliver small items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include a UAV 105 taking off from terminal area 100 with a package for delivery to a destination area 115 (e.g., delivery zone), rising to a cruise altitude, and cruising to the delivery zone. At destination area 115, UAV 105 descends for package drop-off before once again ascending to a cruise altitude for the return journey back to terminal area 100.

If flight paths are not optimized to reduce total nuisance contributions and/or load balancing, the flight paths could fly repeatedly over the same residential homes when other lower impact and variable routes are available. Embodiments described herein calculate and track nuisance contribution values on a per parcel basis and train a neural network (e.g., recurrent neural network, graph neural network, etc.) to generate new flight paths that optimize a total nuisance contribution that each new delivery mission will contribute to the neighborhood with an end goal of mitigating nuisance (noise nuisance, visual nuisance, etc.) to the neighborhood due to operations of the UAV delivery service.

Figure 2:
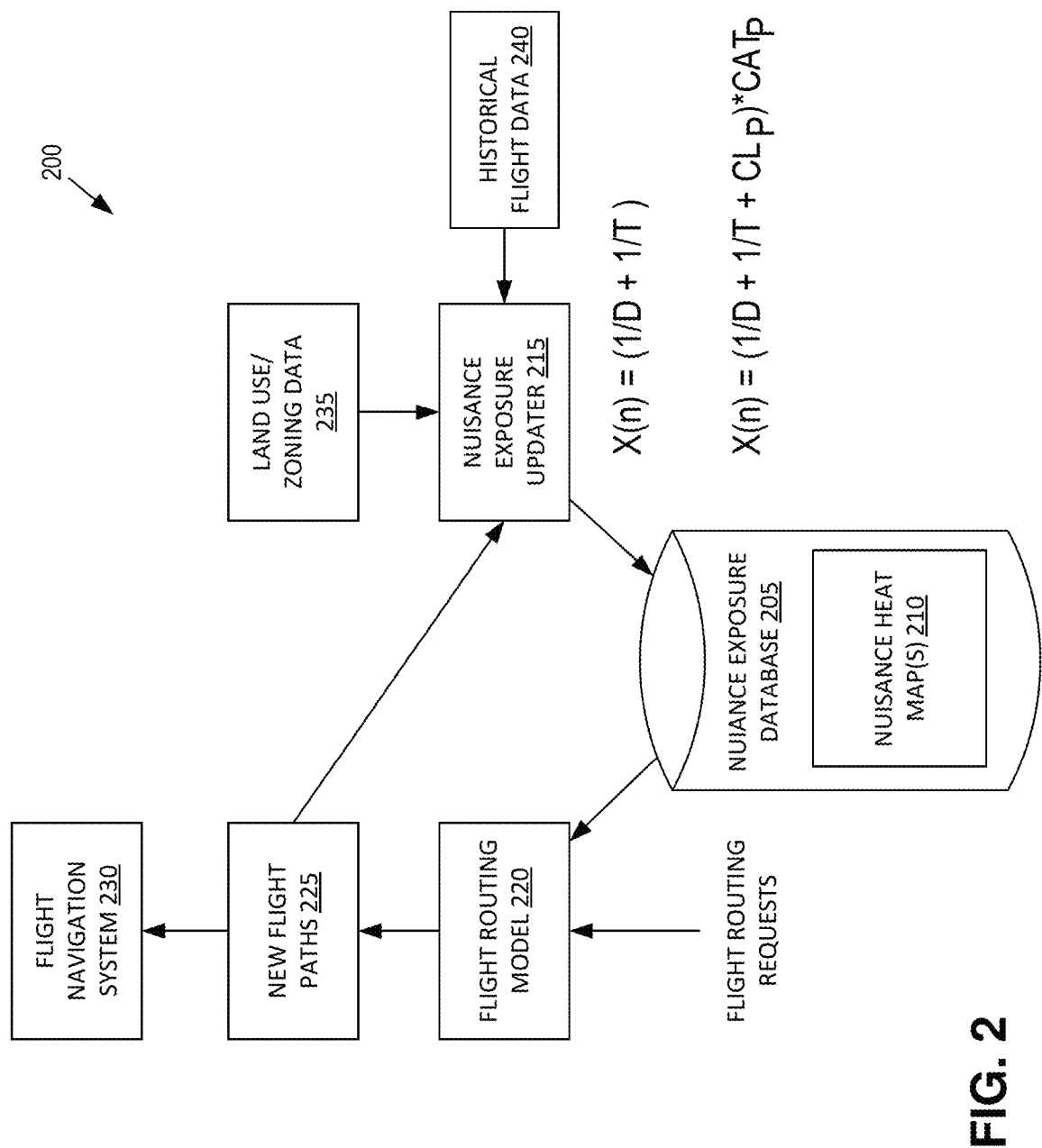
FIG. 2 illustrates a backend system architecture for mitigating nuisance to a neighborhood from a UAV delivery system, in accordance with an embodiment of the disclosure.

FIG. 2 illustrates an architecture for a backend system 200 that mitigates nuisance to a neighborhood from operations of the UAV delivery system, in accordance with an embodiment of the disclosure. The illustrated embodiment of system 200 includes a nuisance exposure database 205 storing a nuisance heat map(s) 210, a nuisance exposure updater 215, a flight routing model 220 that generates new flight paths 225, a flight navigation system 230, land use/zoning data 235, and historical flight data 240.

Figure 4A:
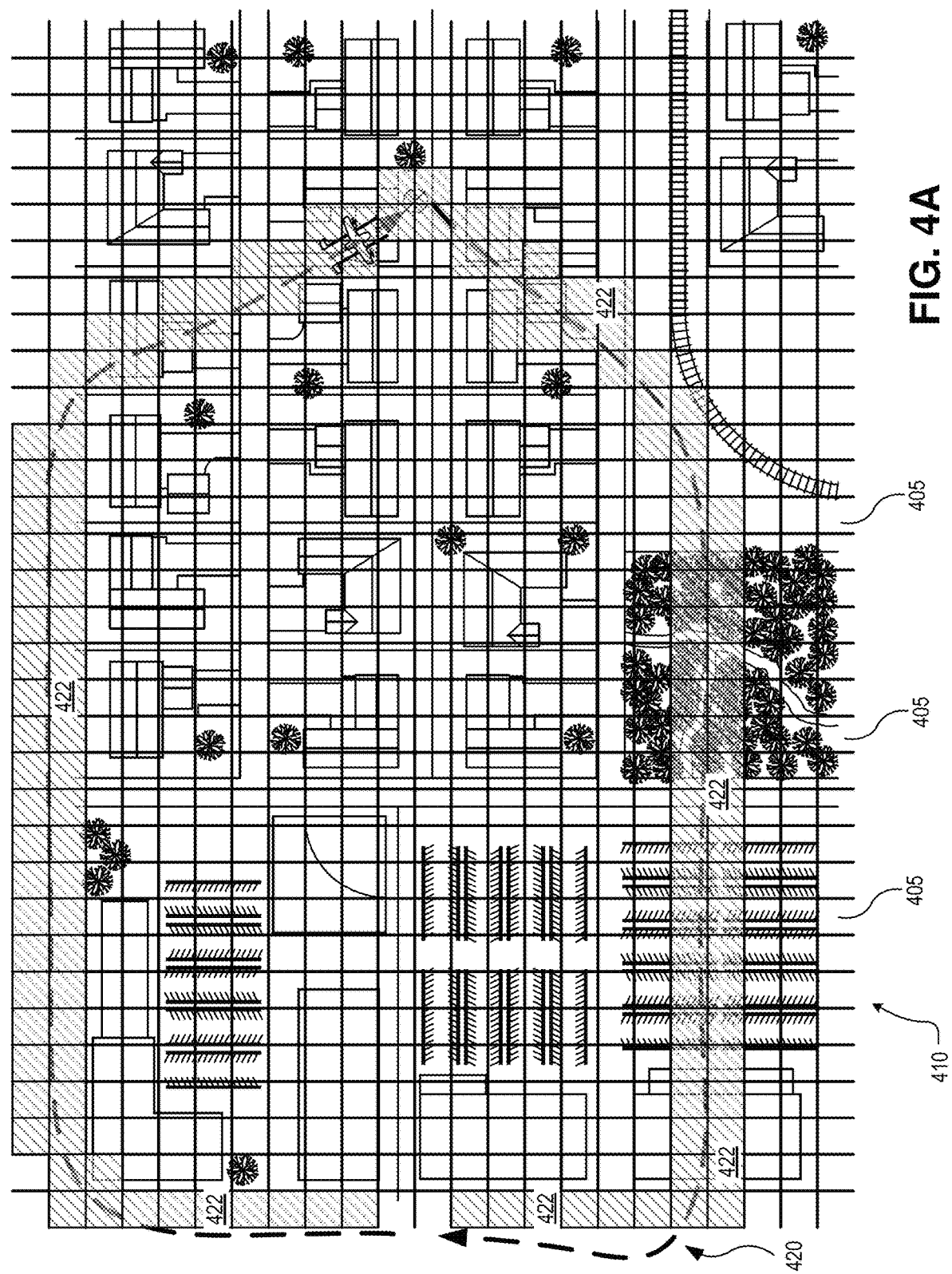
FIG. 4A illustrates a nuisance heat map that segments a neighborhood into parcels that are grid segments of a regular grid, in accordance with an embodiment of the disclosure.
Figure 4B:
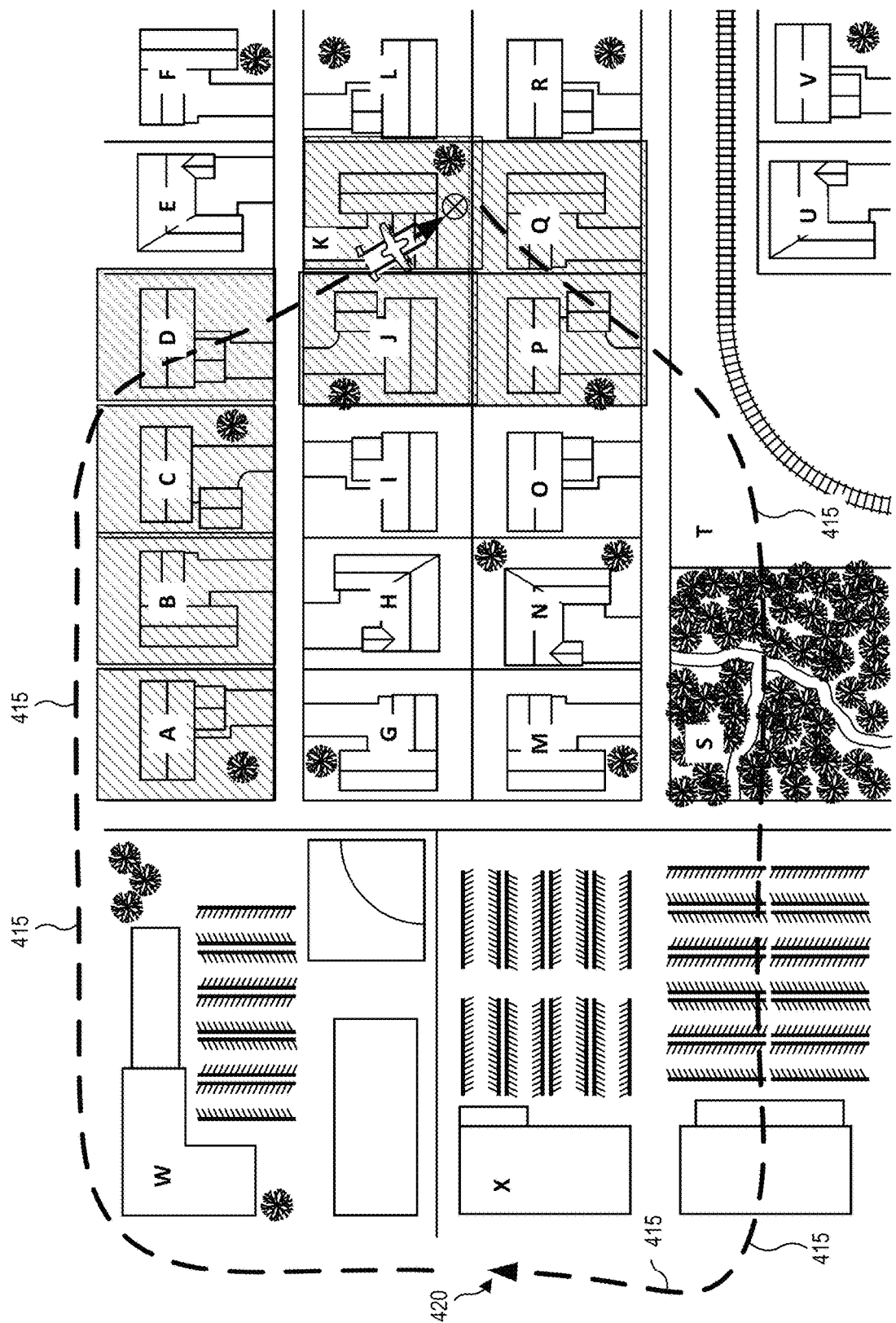
FIG. 4B illustrates a nuisance heat map that segments a neighborhood into tax parcels, in accordance with an embodiment of the disclosure.
Figure 5:
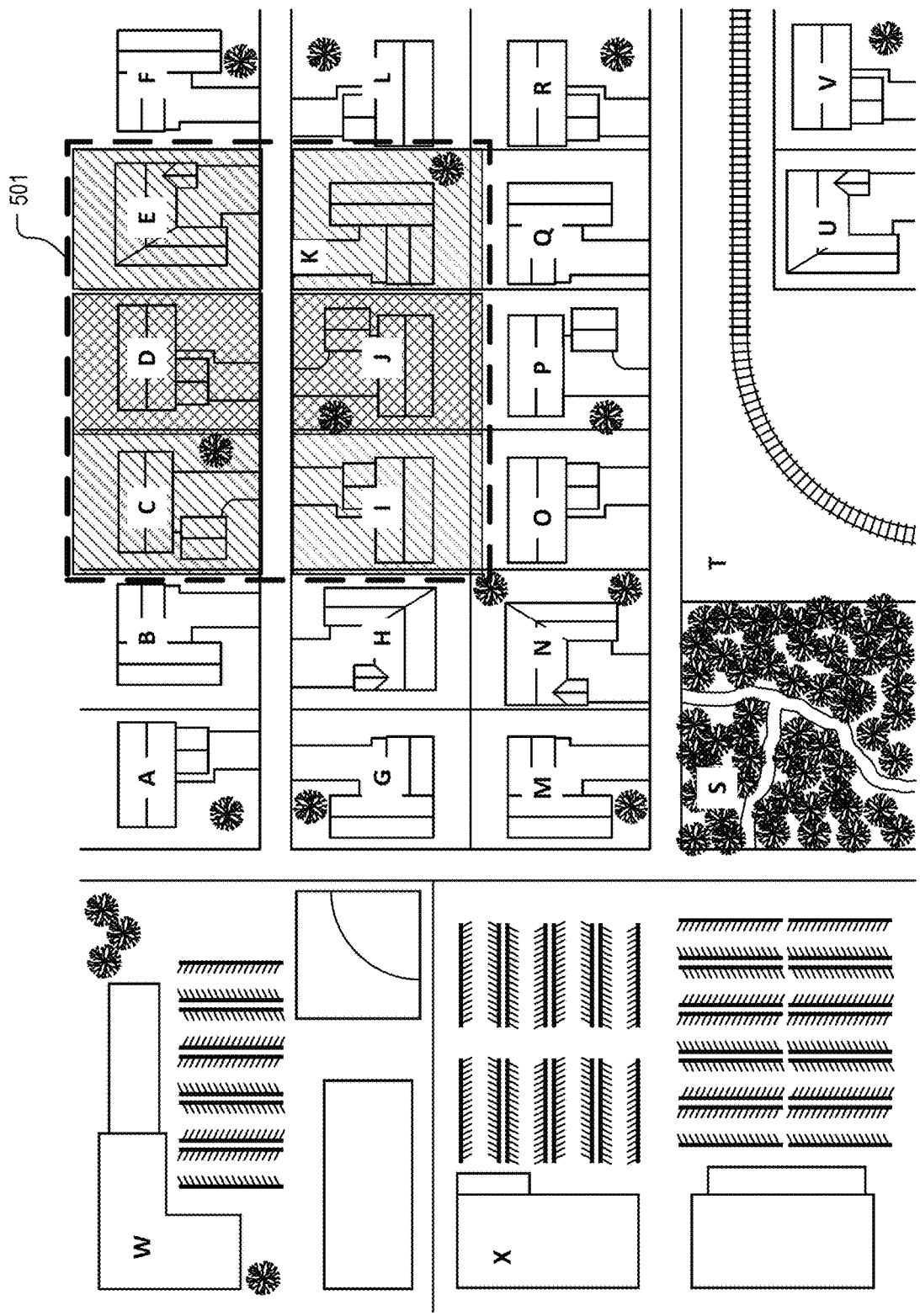
FIG. 5 illustrates how clustering and parcel categorization may be used to further adjust a nuisance contribution value for each parcel, in accordance with an embodiment of the disclosure.

In one embodiment, system 200 is a distributed cloud-based system where certain components are operated on one or more remote servers that communicate over one or more networks with local command and control at terminal area 100, UAVs 105, and even vendor interfaces at vendors 110. Nuisance exposure updater 215 is a software module that takes in land use/zoning data 235 along with historical flight data 240 to generate and maintain nuisance heat map 210 stored within nuisance exposure database 205. Nuisance heat map 210 may be a pictorial map, as illustrated in FIGS. 4A, 4B, and 5, or a non-pictorial data structure that indexes cumulative nuisance contribution values to geographic locations (e.g., parcels). In some embodiments, nuisance heat maps 210 may be generated and updated on a per neighborhood basis (e.g., one nuisance heat map per zip code, per area code, or per other geographic delineation). Nuisance exposure updater 215 calculates a nuisance contribution value $X(n)$ for each parcel n in a neighborhood and indexes those nuisance contribution values $X(n)$ (also referred to as nuisance exposures) to the parcels in a given nuisance heat map 210. In a simplified form, $X(n)$ may be expressed according to Eq. 1:

$$X(n)=(1/D+1/T),\qquad\text{(Eq. 1)}$$

where D is a separation distance between a flight path of a given delivery mission and the parcel n, and T is a lapse time since the given delivery mission occurred. Accordingly, the calculated nuisance contribution value $X(n)$ for a particular parcel n due to a given flight path decays with time T and increases with physical proximity (or falls off with increasing distance). FIG. 4A illustrates how the neighborhood may be segmented into parcels that are grid segments 405 (e.g., 4 m squares, various sized rectangles/squares, or otherwise) of a grid 410 applied over a map of the neighborhood. Alternatively, FIG. 4B illustrates how the neighborhood may be segmented into parcels A-X that represent tax parcels from property records. In one embodiment (with reference to FIG. 4B), nuisance contribution values $X(n)$ may be calculated as a summation of nuisance contributions $X(n)$ from each segment or portion 415 (illustrated as dash segments 415) of a flight path 420 that collectively add together to form the overall flight path 420.

Of course, the nuisance contribution values $X(n)$ may be computed using a more inclusive formula that takes into account additional neighborhood characteristics extracted from land use/zoning data 235 and/or data extracted from historical flight data 240. A more inclusive form of $X(n)$ may be expressed according to Eq. 2:

$$X(n)=(1/D+1/T+CL)*CAT,\qquad\text{(Eq. 2)}$$

where CAT represents a per parcel categorization factor and CL represents a clustering penalty. Of course, the clustering penalty CL may be included as a multiplication scaler rather than an addition bias. Correspondingly, the parcel categorization factor CAT may be included as an addition bias rather than a multiplication scaler.

Accordingly, nuisance contribution values $X(n)$ may be scaled (or otherwise adjusted) based upon a categorization factor CAT associated with each parcel. For example, categorization factor CAT may be selected to increase $X(n)$ for parcels zoned residential relative to parcels zoned commercial or industrial. The categorization factor CAT may also serve to reduce $X(n)$ for unused/underused land, forests, etc. Parks and other community properties that are more commonly used during weekends and evenings may have time sensitive categorization factors that increase $X(n)$ on weekends and evenings but reduce $X(n)$ during typical working/school hours. In other words, a time sensitive categorization factor CAT may encourage flight paths over parks and community spaces during working hours while discouraging flight paths over those same parcels during weekends and/or evenings. Similarly, categorization factor CAT may also be weather sensitive. For example, categorization factor CAT may increase $X(n)$ during sunny/warm weather when people may be outside or have windows open while decreasing $X(n)$ during rainy/cold weather when people may be inside with windows closed. In general, the categorization factor CAT adjusts $X(n)$ to discourage flights over residential homes and highly used community spaces while relatively encouraging routing over empty spaces, industrial spaces, noisy roadways, train tracks, etc. Referring to FIG. 4B as an example, categorization factors CAT(n) may be assigned on a per parcel basis where parcels A-R, U and V have categorization factors CAT(n) greater than 1.0 while commercial properties X and W have categorization factors CAT(n) less than 1.0, forest property S has a categorization factor CAT(n) less than 1.0, and industrial property T has a categorization factor CAT(n) even less than the commercial properties. Of course, these relative values are mere examples and other relative weights/scalers may be applied.

Nuisance contribution values X(n) may be increased (or otherwise adjusted) based upon the clustering penalty CL extracted from nuisance heat map 210. The clustering penalty CL discourages repeated UAV flight paths running proximate to a given parcel that creates a nuisance hot spot 501 (see FIG. 5). As illustrated in FIG. 4A, a delivery mission results in a time decaying nuisance exposure (illustrated as gray path 422) to the parcels in the vicinity of flight path 420. The nuisance contributions are calculated as nuisance contribution values X(n) per parcel and added to nuisance heat map 210. Repeated flight paths in a short period of time proximate to a given parcel, or set of parcels n, may result in a nuisance hot spot 501, which show elevated cumulative/aggregate nuisance contribution values X(n). When nuisance clustering appears in nuisance heat map 210, a clustering penalty CL is applied to increase the value of each added nuisance contribution value X(n) from a given flight, thereby discouraging future flight paths adjacent to the nuisance hot spot 501. The clustering penalty CL is applied by nuisance exposure updated 215 to spread out flight paths thereby load balancing nuisance exposures over the neighborhood.

Flight routing model 220 takes nuisance heat map 210 and a new flight routing request and automatically generates new flight paths 225 that optimize the total nuisance contribution that a new delivery mission will contribute to the neighborhood. This optimization may include generating a flight path that seeks to minimize the total nuisance contribution X from the new delivery mission and/or load balancing the nuisance exposures. Seeking both goals of minimizing total nuisance contributions with load balancing the nuisance exposures can include tradeoffs between the two goals. In one embodiment, flight routing model 220 is a ML model (e.g., recurrent neural network, graph neural network, etc.) that has been trained to both load balance nuisance contributions and/or minimize total nuisance contributions when generating a new flight path. Training of the neural network may be accomplished using reinforcement learning that incorporates X(n) as a cost function during backpropagation when training the weights and biases of the neural network. In one embodiment, a distinct RNN is trained on historical flight data 240 and land use/zoning data 235 for a given neighborhood. In other words, a distinctly trained flight routing model 220 may be used for each neighborhood. In other embodiments, flight routing model 220 may be generically trained to generate new flight paths across any neighborhood, or neighborhoods of a certain classification (e.g., rural vs suburban vs urban neighborhoods). Historical flight data 240 and land use/zoning data 235 provide a training dataset that when combined with the cost function enable a RNN to explore a given neighborhood during training to maximize a cumulative reward achieved by minimizing the cost function. In other embodiments, randomly generated flight paths may be used during reinforcement learning. In one embodiment, the cost function may include both X(n) along with a penalty factor for nuisance clusters. Such a cost function balances both total nuisance reduction with load balancing.

Figure 3:
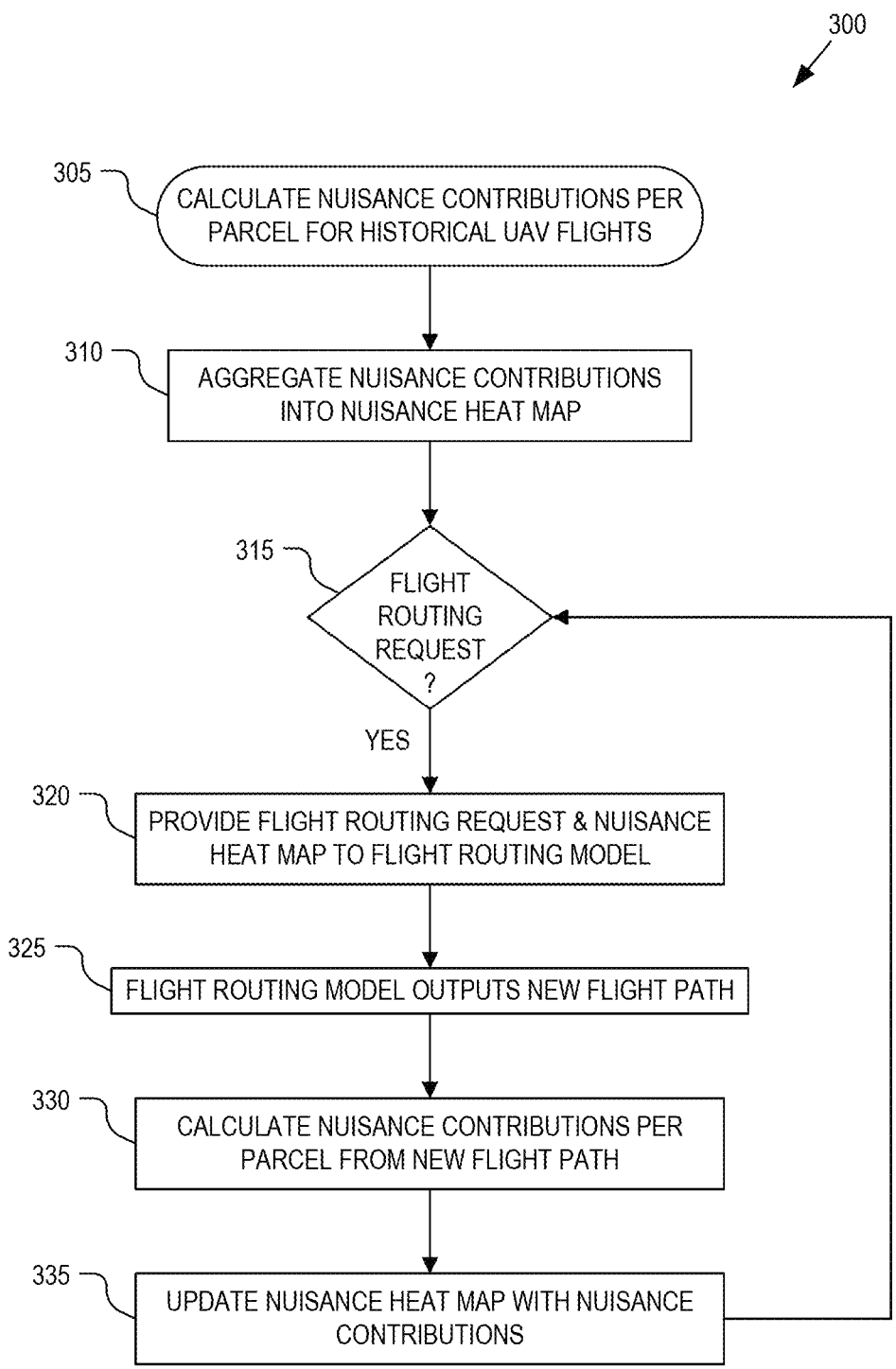
FIG. 3 is a flow chart illustrating a process for mitigating nuisance to a neighborhood from operations of a UAV delivery system, in accordance with an embodiment of the disclosure.

FIG. 3 is a flow chart illustrating a process 300 for mitigating nuisance to a neighborhood from operations of a UAV delivery system, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, nuisance exposure updater 215 calculates nuisance contribution values X(n) for each parcel n based upon historical flight data 240. Each flight path from historical flight data 240 results in its own nuisance exposures for each parcel n, which are aggregated by nuisance exposure updater 215 into nuisance heat map 210 for a particular neighborhood (process block 310). As described above, nuisance heat map 210 may be generated by calculating nuisance contribution values X(n) from each historical flight path and may also include clustering penalties to encourage load balancing. In some embodiments, parcel categorizations are determined from land use/zoning data 235 (or from other sources) may also be considered when calculating nuisance contribution values X(n).

Upon receipt of a new flight routing request (decision block 315), flight routing model 220 takes the new flight routing request along with nuisance heat map 210 as an input to its neural network (process block 320) and outputs a new flight path for the new delivery mission into the neighborhood (process block 325). Referring to FIG. 4A, when UAV 105 flies the new delivery mission, its flight path 420 subjects the parcels n residing along and proximate to flight path 420 to nuisance exposures (illustrated as gray path 422). In connection with the new delivery mission being flown by a UAV 105, nuisance exposure updater 215 calculates the nuisance exposures as nuisance contribution values X(n) per parcel n (process block 330) and aggregates those new nuisance contribution values X(n) into nuisance heat map 210. In yet another embodiment, the RNN nature of flight routing model 220 can maintain stateful information across multiple flight routing requests and only needs to reference nuisance heat map 210 and/or historical flight data 210 initially or until the current processing session expires. In other words, after the initial input of nuisance heat map 210, the accumulation of new nuisance contributions from new flight paths may be maintained within the feedforward paths of the RNN during a stateful processing session.

Figure 6A:
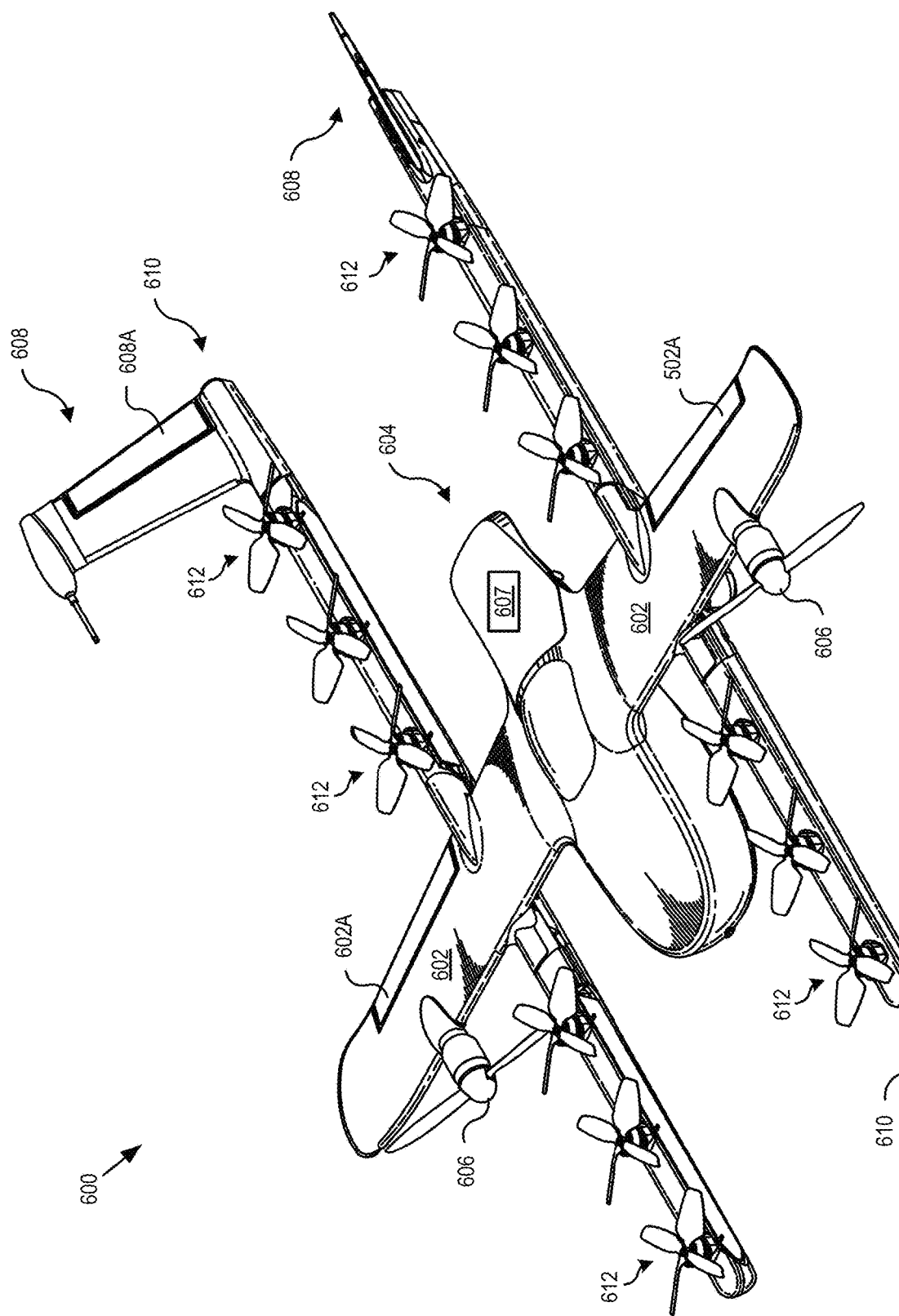
FIG. 6A is a perspective view illustration of a UAV configured for use in a UAV delivery system, in accordance with an embodiment of the disclosure.
Figure 6B:
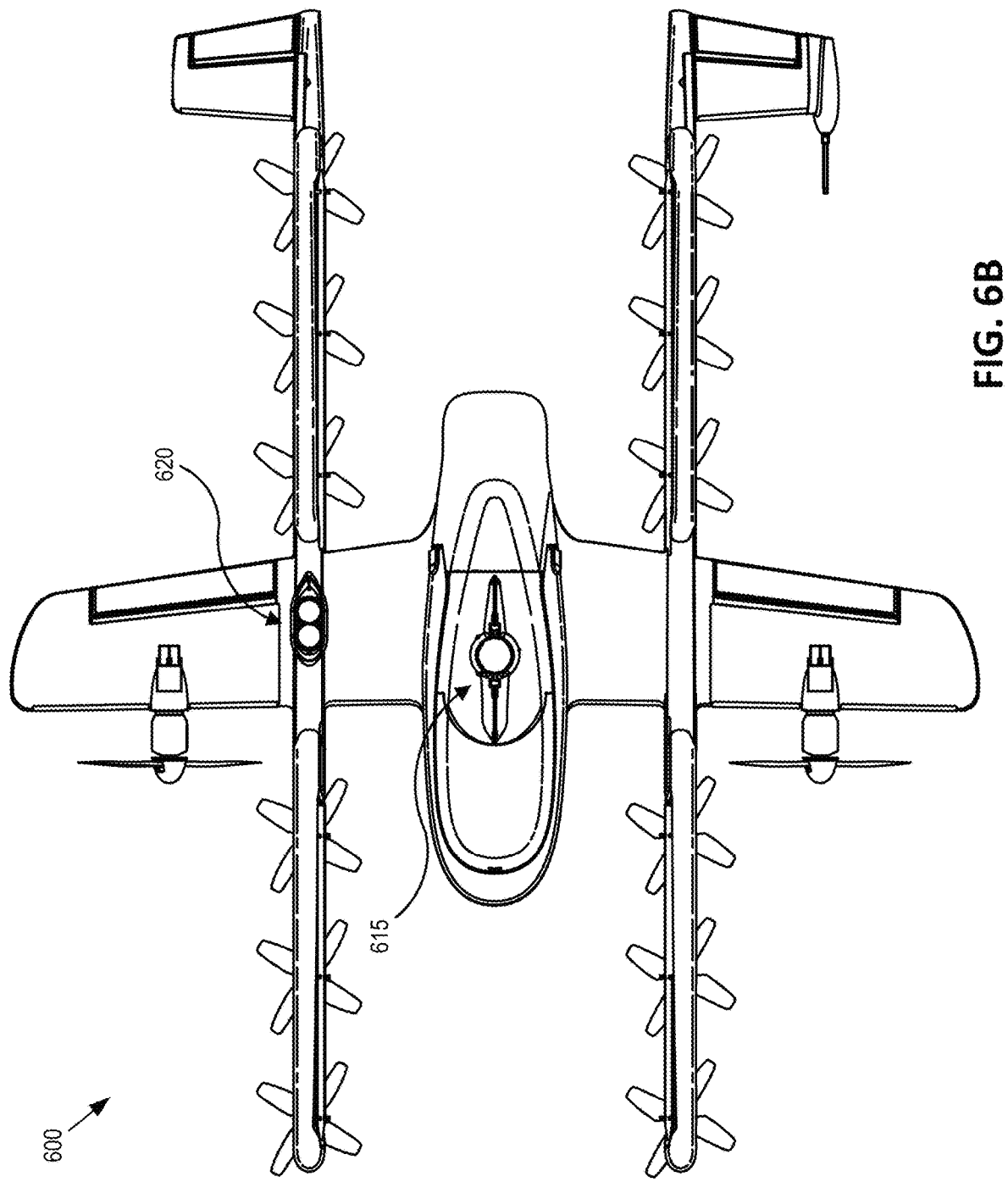
FIG. 6B is an underside plan view illustration of the UAV configured for use in the UAV delivery system, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIG. 1, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global navigation satellite system (GNSS) sensors, an inertial measurement unit (IMU), a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for dispensing and recoiling a line when picking up a package during a package delivery mission. In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation, localization, and navigation as well as operate as an optical code scanner for reading visual codes affixed to packages. These visual codes may be associated with or otherwise match to delivery missions and provide the UAV with a handle for accessing destination, delivery, and package validation information.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method for mitigating nuisance to a neighborhood from operations of an unmanned aerial vehicle (UAV) delivery service, the computer implemented method comprising:
calculating nuisance contributions to the neighborhood for each of a plurality of UAV flights over the neighborhood;
aggregating the nuisance contributions for each of the UAV flights into a nuisance heat map stored in a nuisance exposure database, wherein the nuisance heat map segments the neighborhood into parcels;

receiving, at a machine learning (ML) model, a flight routing request to fly a new delivery mission over the neighborhood; and generating a new flight path for the new delivery mission with the ML model in response to receiving the flight routing request, wherein the ML model is trained to receive the nuisance heat map and the flight routing request as inputs and output the new flight path that optimizes a total nuisance contribution that the new delivery mission will contribute to the neighborhood, wherein calculating the nuisance contributions to the neighborhood for a first UAV flight of the UAV flights having a first path comprises:

for a given parcel of the parcels, calculating a nuisance contribution value that is inversely proportional to both a separation distance between the first flight path and the given parcel and a lapsed time since the first UAV flight; and repeating the calculating of the nuisance contribution value for other parcels of the parcels in the neighborhood.

2. The computer implemented method of claim 1, wherein optimizing the total nuisance contribution comprises a combination of minimizing the total nuisance contribution to the neighborhood and load balancing the nuisance contributions to reduce nuisance hot spots on the nuisance heat map.

3. The computer implemented method of claim 2, wherein the ML model comprises a recurrent neural network trained with reinforcement learning on historical flight paths or randomly generated flight paths over the neighborhood using a cost function that penalizes the nuisance contributions and penalizes clustering of the nuisance contributions.

4. The computer implemented method of claim 1, wherein the nuisance heat map indexes nuisance exposures to the parcels as quantified by aggregating the nuisance contributions on a per parcel basis.

5. The computer implemented method of claim 4, wherein the parcels comprise grid segments of a regular grid applied over a map of the neighborhood.

6. The computer implemented method of claim 4, wherein the parcels comprise tax parcels from property records.

7. The computer implemented method of claim 1, wherein calculating the nuisance contributions to the neighborhood for the first UAV flight further comprises:

applying a clustering penalty to the nuisance contribution value to discourage repeated UAV flights proximate to the given parcel that create a nuisance hot spot on the nuisance heat map.

8. The computer implemented method of claim 1, wherein calculating the nuisance contributions to the neighborhood for the first UAV flight further comprises:

adjusting the nuisance contribution value based upon a categorization of the given parcel.

9. The computer implemented method of claim 8, wherein the categorization is based upon land use or zoning data and wherein residential zoning for the given parcel increases the nuisance contribution value relative to commercial or industrial zoning.

10. At least one non-transient computer-readable medium storing instructions that, when executed by a machine, will cause the machine to perform operations comprising:

calculating nuisance contributions to a neighborhood for each of a plurality of unmanned aerial vehicle (UAV) flights over the neighborhood by a UAV delivery service;

aggregating the nuisance contributions for each of the UAV flights into a nuisance heat map stored in a nuisance exposure database, wherein the nuisance heat map segments the neighborhood into parcels;

receiving, at a machine learning (ML) model, a flight routing request to fly a new delivery mission over the neighborhood; and generating a new flight path for the new delivery mission with the ML model in response to receiving the flight routing request, wherein the ML model is trained to receive the nuisance heat map and the flight routing request as inputs and output the new flight path that optimizes a total nuisance contribution that the new delivery mission will contribute to the neighborhood, wherein calculating the nuisance contributions to the neighborhood for a first UAV flight of the UAV flights having a first path comprises:

for a given parcel of the parcels, calculating a nuisance contribution value that is inversely proportional to both a separation distance between the first flight path and the given parcel and a lapsed time since the first UAV flight; and repeating the calculating of the nuisance contribution value for other parcels of the parcels in the neighborhood.

11. The at least one non-transient computer-readable medium of claim 10, wherein optimizing the total nuisance contribution comprises a combination of minimizing the total nuisance contribution to the neighborhood and load balancing the nuisance contributions to reduce nuisance hot spots on the nuisance heat map.

12. The at least one non-transient computer-readable medium of claim 11, wherein the ML model comprises a recurrent neural network trained with reinforcement learning on historical flight paths or randomly generated flight paths over the neighborhood using a cost function that penalizes the nuisance contributions and penalizes clustering of the nuisance contributions.

13. The at least one non-transient computer-readable medium of claim 10, wherein the nuisance heat map indexes nuisance exposures to the parcels as quantified by aggregating the nuisance contributions on a per parcel basis.

14. The at least one non-transient computer-readable medium of claim 13, wherein the parcels comprise grid segments of a regular grid applied over a map of the neighborhood.

15. The at least one non-transient computer-readable medium of claim 13, wherein the parcels comprise tax parcels from property records.

16. The at least one non-transient computer-readable medium of claim 10, wherein calculating the nuisance contributions to the neighborhood for the first UAV flight further comprises:

applying a clustering penalty to the nuisance contribution value to discourage repeated UAV flights proximate to the given parcel that create a nuisance hot spot on the nuisance heat map.

17. The at least one non-transient computer-readable medium of claim 10, wherein calculating the nuisance contributions to the neighborhood for the first UAV flight further comprises:

adjusting the nuisance contribution value based upon a categorization of the given parcel.

18. The at least one non-transient computer-readable medium of claim 17, wherein the categorization is based upon land use or zoning data and wherein residential zoning for the given parcel increases the nuisance contribution value relative to commercial or industrial zoning.

19. A computer implemented method for mitigating nuisance to a neighborhood from operations of an unmanned aerial vehicle (UAV) delivery service, the computer implemented method comprising:
- calculating nuisance contributions to the neighborhood for each of a plurality of UAV flights over the neighborhood;
- aggregating the nuisance contributions for each of the UAV flights into a nuisance heat map stored in a nuisance exposure database;
- receiving, at a machine learning (ML) model, a flight routing request to fly a new delivery mission over the neighborhood; and
- generating a new flight path for the new delivery mission with the ML model in response to receiving the flight routing request, wherein the ML model is trained to receive the nuisance heat map and the flight routing request as inputs and output the new flight path that optimizes a total nuisance contribution that the new delivery mission will contribute to the neighborhood,
- wherein the ML model is trained using a cost function that penalizes the nuisance contributions and penalizes clustering of the nuisance contributions.

20. The computer implemented method of claim 19, wherein optimizing the total nuisance contribution comprises a combination of minimizing the total nuisance contribution to the neighborhood and load balancing the nuisance contributions to reduce nuisance hot spots on the nuisance heat map.

* * * * *